United States Patent [19]

Kim

[11] Patent Number: 5,686,781
[45] Date of Patent: Nov. 11, 1997

[54] FAR-INFRARED EMITTING CATHODE RAY TUBE

[75] Inventor: Heon-soo Kim, Seoul, Rep. of Korea

[73] Assignee: Samsung Electron Devices Co., Ltd., Kyungki-do, Rep. of Korea

[21] Appl. No.: 761,146

[22] Filed: Dec. 6, 1996

Related U.S. Application Data

[63] Continuation of Ser. No. 669,828, Jun. 26, 1996, which is a continuation of Ser. No. 979,146, Nov. 19, 1992, abandoned.

[30] Foreign Application Priority Data

| Nov. 20, 1991 | [KR] | Rep. of Korea | 91-20698 |
| Nov. 21, 1991 | [KR] | Rep. of Korea | 91-20849 |
| Nov. 22, 1991 | [KR] | Rep. of Korea | 91-20891 |
| Nov. 26, 1991 | [KR] | Rep. of Korea | 91-21294 |
| Jun. 9, 1992 | [KR] | Rep. of Korea | 92-9993 |

[51] Int. Cl.[6] ............................................ H01J 29/18
[52] U.S. Cl. ........................................ 313/112; 313/110
[58] Field of Search ............................. 313/110, 112; 250/493.1, 504 R, 495.1; 359/359

[56] References Cited

U.S. PATENT DOCUMENTS

| 4,178,514 | 12/1979 | Bly | 250/493 |
| 4,267,204 | 5/1981 | Tomita et al. | 427/68 |
| 4,377,618 | 3/1983 | Itkeda e al. | 428/523 |
| 4,542,299 | 9/1985 | Scholz et al. | 250/504 R |
| 4,565,946 | 1/1986 | Barrett et al. | 313/408 |
| 4,687,967 | 8/1987 | Rusche et al. | 313/478 |
| 4,717,856 | 1/1988 | Kato | 313/466 |
| 4,886,972 | 12/1989 | Nakai et al. | 250/504 R |
| 4,999,502 | 3/1991 | Midavaine | 250/495.1 |
| 5,012,112 | 4/1991 | Flint et al. | 250/493.1 |

FOREIGN PATENT DOCUMENTS

| 257883 | 2/1990 | Japan . |
| 2309169 | 12/1990 | Japan . |

*Primary Examiner*—Sandra L. O'Shea
*Assistant Examiner*—Vip Patel
*Attorney, Agent, or Firm*—Leydig, Voit & Mayer

[57] ABSTRACT

A cathode ray tube which emits harmful electromagnetic waves includes far-infrared emitting material which emits far-infrared rays which reduce the harmful effects of electromagnetic waves. The far-infrared emitting cathode ray tube is obtained by including far-infrared emitting material in at least one of a phosphor layer, a black matrix, an outer graphite layer, and a shadow mask. This far-infrared emitting cathode ray tube provides a user favorable work place by reducing the harmful effects of electromagnetic waves.

17 Claims, 12 Drawing Sheets
(3 of 12 Drawing(s) in Color)

FAR-INFRARED EMITTING CATHODE RAY TUBE

This disclosure is a continuation of patent application Ser. No. 08/669,828, filed Jun. 26, 1996, which is a continuation of patent application Ser. No. 07/979,146, filed Nov. 19, 1992, and now abandoned.

BACKGROUND OF THE INVENTION

The present invention relates to a far-infrared emitting cathode ray tube, and more particularly to a far-infrared emitting cathode ray tube which includes far-infrared emitting material therein and thus emits far-infrared rays which can be directed towards a human body.

While continuing the development toward an information-oriented society, people are increasingly suffering from a phenomenon, i.e., known as visual display terminal (VDT) syndrome. This phenomenon is caused by exposure to electromagnetic waves which are prevalent in the and working environment. Although some electromagnetic waves are weak in intensity, they can still cause effects such as bloodshot eyes, amblyopia, headache, muscular pain, chronic fatigue, languor, skin roughness, etc., to persons who are exposed to them. The most favorable method to prevent exposure is to shield the electromagnetic waves. However, the high cost of implementation inhibits the adoption of this method. Accordingly, a cathode my tube has been recognized as harmful to the human body except its function of transmitting information.

Far-infrared rays are a kind of electromagnetic wave having wave lengths ranging from 5 μm to 1,000 μm wavelength (The standard wavelength region of the far-infrared rays are not critically defined. This range is selected to exclude near-infrared rays in this invention), far-infrared rays are known to have various biological effects such as activation of hydrogen oxide molecules, maturation, freshness preservation, growth acceleration, energy saving, sterilization, deodorization, etc. Also, far-infrared rays are used in appliances such as saunas refrigerators, microwave ovens, and the like. The effects of far-infrared rays cannot be represented by numerical and logical results obtained by means of scientific measuring instruments, but can be indirectly perceived. More specifically, far-infrared lamp light promotes the growth of a plant, a far-infrared sauna lets a man sweat even under low temperature, a far-infrared refrigerator keeps meat and fish fresh for a long time, a far-infrared emitting article makes cigarette and liquor tasty once exposed thereto, far-infrared rays shorten the painting process when applying it, etc.

It is explained that the influence of far-infrared rays on human body is classified into two effects, i.e., the thermal effect and the non-thermal effect. The thermal effect indicates that heat energy absorbed from skin affects peripheral tissue, deep tissue of a living organism, or the overall living organism by the circulation of blood flowing through a peripheral blood vessel. The non-thermal effect indicates that light quantums corresponding to specific wavelengths of far-infrared rays stimulate the receptors of the cell membrane in the outside or inside skin, and a far-infrared signal of a specific wavelength is transmitted into cells, thereby activating the cells. Consequently, far-infrared ray function as a heat energy supply source in thermal effect, and a light quantum supply source in non-thermal effect. Through these effects such as direct thermal effect as an infrared ray, indirect effect by activating water constituting a part of the body, and non-thermal effect for stimulating nervous receptors for sensing various warmth, coolness, pain which are placed in the skin around 100 μm deep, the far-infrared ray provides acceleration of the blood circulation, speedy release of waste matter, etc.

The effect of the far-infrared ray with respect to water (which constitutes most of the human body) will be described in detail below. FIG. 1 is a graphical representation showing the transmittance of water in accordance with wavelength. Here, it can be noted that water absorbs light whose wavelength is near 3 μm or longer than 6 μm. In a water molecule ($H_2O$, H—O—H), stretching vibration of the O—H bond between oxygen and hydrogen occurs between 2.5–3.5 μm, and bending vibration occurs between 10–14 μm. Thus, when light of these wavelengths is observed, the absorption of the light accelerates the vibration of the water. In other words, by externally supplying light of these wavelengths, water molecules are activated so as to be arranged in the ideal bonding structure.

The wavelength, of a human body can be calculated by taking body temperature, in accordance with the relation between absolute temperature and wavelength called the Wien formula. Accordingly, the wavelength of the human body is defined as: $\lambda=2897/T$ (where T denotes an absolute temperature and $\lambda$ denotes a wavelength in micrometers). Namely, when 309.5 (273+36.5) is substituted for T, the wavelength becomes 9.36 μm which is within the far-infrared range.

FIGS. 2A and 2B are graphical representations respectively showing a spectral transmittance (2A) and a spectral reflectance (2B) of human skin according to each wavelength. The infrared wavelength emitted from a human's skin is within the range of 3–50 μm, and especially, the wavelength within the range of 8–14 μm which occupies approximately 46% of the total emitted energy. The energy emitted to the skin is transmitted, reflected or absorbed and, therefore, the amount of the energy absorbed by the skin can be calculated considering FIGS. 2A and 2B. For example, almost all of the energy within 8 to 14 μm region of which transmittance and reflectance is low, are absorbed by the skin. Thus, upon supplying energy in this range, a living body mostly consisting of water is easily activated. In application, exposure to light in this wavelength results int he early blossoming of flowers a shortened period and early maturation of a hatching egg, prolonged life of cut flowers, etc.

Several products using the far-infrared effect are practically presented, e.g., a far-infrared refrigerator disclosed in Japanese Laid-Open Publication Nos. Hei 2-57883 and Hei 2-309169, a far-infrared emitting bathtub disclosed in Japanese Laid-Open Publication No. Hei 2-164365, etc.

Metal oxides such as alumino-silicates ($Al_2O_3$—$SiO_2$), cordierites (MgO—$Al_2O_3$—$SiO_2$), zircons ($ZrO_2$—$SiO_2$), carbons, ferric oxide ($Fe_2O_3$), manganese dioxide ($MnO_2$), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), and calcium oxide (CaO) are examples of far-infrared emitting materials.

SUMMARY OF THE INVENTION

It is an object of the present invention to provide a far-infrared emitting cathode ray tube which emits far-infrared rays to counteract the effects of electromagnetic waves which are a common cause of VDT syndrome.

To achieve the above object of the present invention, there is provided a far-infrared emitting cathode ray tube, wherein far-infrared emitting material is included in at least one of a phosphor layer, a black matrix, an outer graphite layer, and a shadow mask, thereby emitting far-infrared rays.

As embodiments for providing the far-infrared emitting cathode ray tube, the far-infrared emitting material is included in or coated on at least one of the inside the phosphor layer, the inside or upper portion of the black matrix layer, the inside or upper portion of the outer graphite layer, and the outer surface of the graphite layer on the shadow mask.

Particularly, the present invention provides a cathode ray tube wherein the far-infrared emitting material having not more than 5 μm average diameter is formed on the upper portion of the black matrix in a thickness of 0.2–100 μm; a cathode ray tube wherein the far-infrared emitting material having not more than 5 μm average diameter is included within the black matrix layer as much as 1–100 wt %, based upon the total amount of the mixture with the graphite; a cathode ray tube wherein the far-infrared emitting material is not more than 50 wt % with respect to the amount of the phosphor in the phosphor layer; a cathode ray tube wherein the average diameter of the far-infrared emitting material having a diameter of 0.05–2 μm is coated to a thickness of about 0.1–10 μm on the outer surface of the shadow mask toward the phosphor layer; and a cathode ray tube wherein the far-infrared emitting material is included in the outer graphite layer which is formed on the outer surface of the funnel of the cathode my tube.

The far-infrared emitting material is selectively included in each portion of the cathode ray tube, or included in all portions as circumstances require.

As for the far-infrared emitting materials, at least one selected from the group consisting of aluminium oxide ($Al_2O_3$), silicon dioxide ($SiO_2$), magnesium oxide (MgO), zirconium oxide ($ZrO_2$), carbons, ferric oxide ($Fe_2O_3$), manganese dioxide ($MnO_2$, MnO), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO) and a complex thereof can be employed.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

These and other objects, features, aspects and advantages of the present invention will become more apparent from the following detailed description of the present invention when taken in conjunction with the accompanying drawings, in which.

DETAILED DESCRIPTION OF THE INVENTION

Even though any material capable of emitting far-infrared rays may be adopted in the following examples, the most preferable method will be given as an example hereinbelow since the additive amount or application method of the materials varies to suit the characteristics and limitations of the applied articles.

According to one example of the present invention, a far-infrared emitting cathode ray tube has a screen which includes a black matrix layer covering the inner surface of a panel by a predetermined pattern, a phosphor layer arranged between stripes of the black matrix layer and emitting various colors by filtering the electromagnetic wave, and an aluminum layer for enhancing the overall luminance of the panel and strengthening the electrical potential of phosphor screen, wherein a far-infrared emitting material layer is installed on the black matrix layer.

The above-described far-infrared emitting screen is manufactured in accordance with the following steps. The black matrix layer of a predetermined pattern is first formed on the inner surface of the panel. A photoresist layer is formed by coating, exposing and developing a photoresist on the black matrix layer, and then a far-infrared emitting material layer is formed by coating far-infrared emitting material on the photoresist layer. Successively, after coating, exposing, and developing a photoresist for forming a phosphor, phosphor slurry is coated, exposed, and developed, thereby forming a phosphor layer between the stripes of the black matrix layer.

The far-infrared emitting material is at least one of $SiO_2$, $Al_2O_3$, MgO, $Na_2O$, $P_2O_5$, $K_2O$, $ZrO_2$, CaO and $TiO_2$; the preferable average particle diameter of these is not more than 5 μm.

The thickness of the far-infrared emitting material layer is 0.2–100 μm, and preferably 0.5–50 μm.

Hereinbelow, the above-stated method for manufacturing the far-infrared emitting screen will be described in detail with reference to FIGS. 3A through 3I.

EXAMPLE 1

Figure 1:
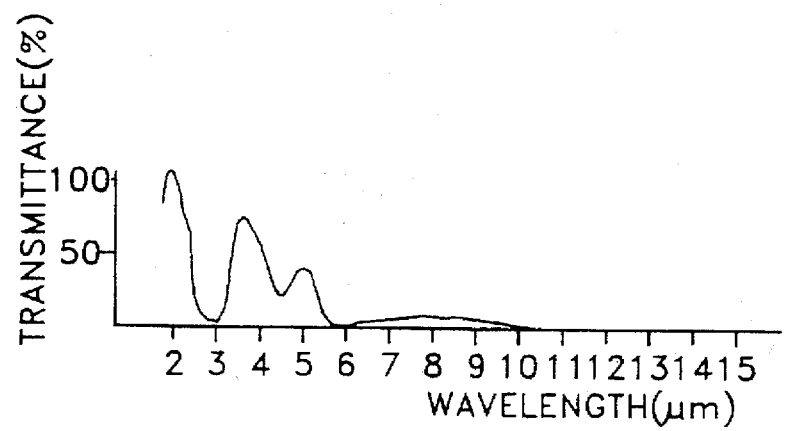
FIG. 1 is a graphical representation illustrating the transmittance of water versus wavelength.
Figure 2A:
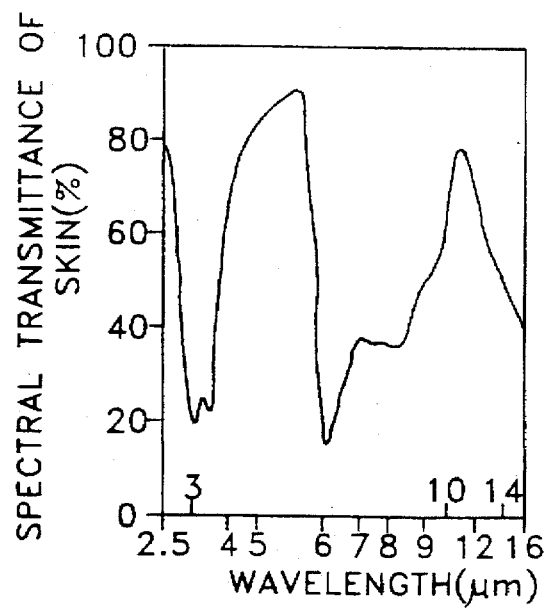
FIGS. 2A and 2B are graphical representations respectively illustrating the spectral transmittance and spectral reflectance of the skin versus wavelength.
Figure 2B:
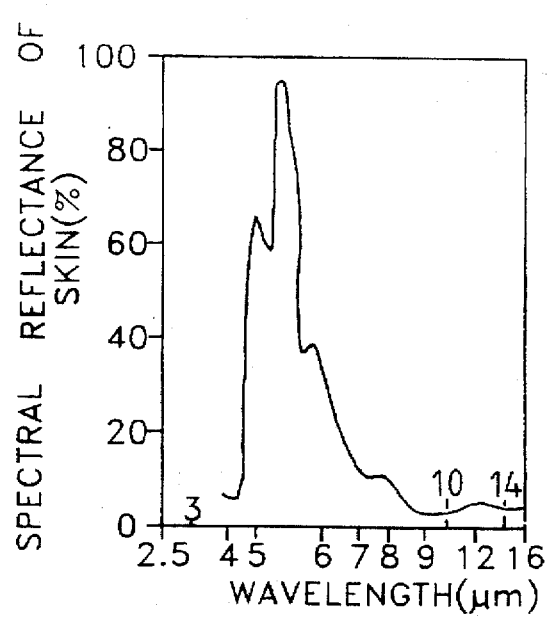
Figure 3A:
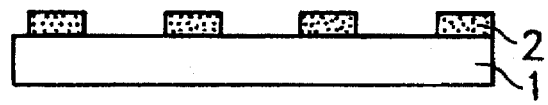
FIGS. 3A through 3I illustrate a process for manufacturing a screen according to example 1 of the present invention.
Figure 3B:
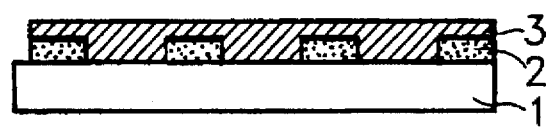

A panel 1 is cleansed using hydrofluoric acid and distilled water according to a conventional method prior to drying it. Then, a photoresist composed of polyvinyl alcohol, sodium bichromate, acryl emulsion, etc. is coated on the inner surface of panel 1, and thus a photoresist pattern is formed by drying, exposing and developing. After covering and drying graphite on the photoresist pattern, a black matrix pattern 2 is formed by separating this photoresist pattern, using an etching solution (FIG. 3A).

Figure 3C:
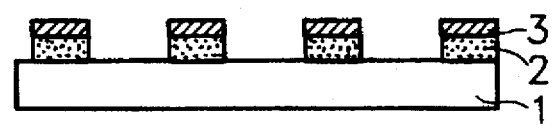
Figure 3D:
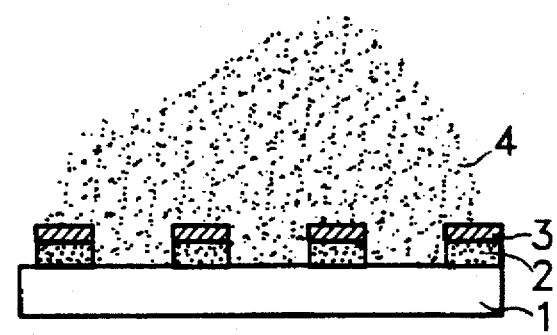
Figure 3E:
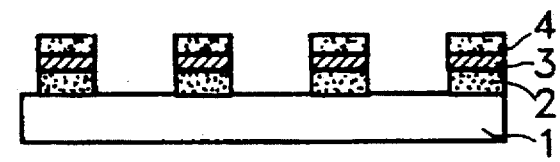
Figure 3F:
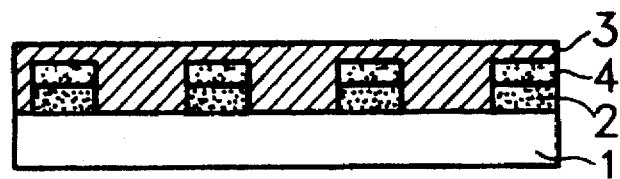
Figure 3G:
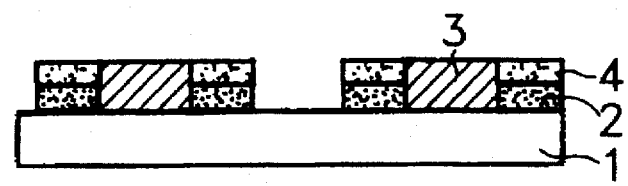
Figure 3H:
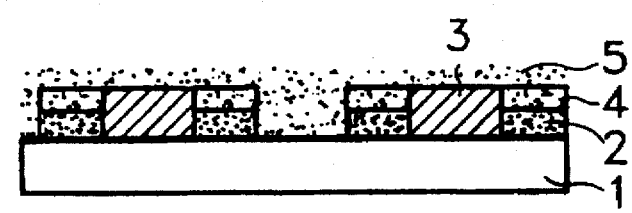
Figure 3I:
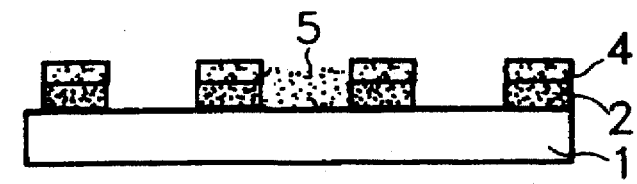

After covering a negative-type photoresist 3 on the black matrix pattern 2 (FIG. 3B), the photoresist on the panel is exposed to light and developed through a shadow mask, so that the photoresist layer on panel 1 is removed and an unexposed resist layer is left on black matrix 2 (FIG. 3C). After this, a far-infrared emitting material 4, composed of at least one of silicon dioxide ($SiO_2$), aluminium oxide ($Al_2O_3$), magnesium oxide (MgO), sodium oxide ($Na_2O$), phosphorus pentoxide ($P_2O_5$), potassium oxide ($K_2O$), zirconium dioxide ($ZrO_2$), calcium oxide (CaO) and titanium oxide ($TiO_2$) and having not more than a 5 μm average diameter, is sprayed on the upper portion of black matrix 2 and the resist layer 3, using a spray gun whose nozzle has a diameter of 0.4 mm (FIG. 3D). Therefore, a far-infrared emitting material layer 4 is formed on the upper portion of resist layer 3 on black matrix 2 (FIG. 3E). Then, via the sequence of an ordinary slurry process, i.e. photoresist coating (FIG. 3F), exposure and development (FIG. 3G), phosphor slurry coating (FIG. 3H), and an exposure and development (FIG. 3I), a first phosphor layer 5 is formed (FIG. 3I). Finally, after forming a second and third phosphor layer via the same common slurry process, a screen for a cathode ray tube having the black matrix, far-infrared emitting material layer, phosphor layer, and the aluminum layer is formed through the sequential steps of filming composition coating, aluminum deposition, and baking.

The thickness of the far-infrared emitting layer is between 0.2 μm to 100 μm, and preferably is the range of 0.5 μm to 50 μm. If the layer's thickness is greater than 100 μm, manufacture of the phosphor layer is difficult and the material powder separates easily. On the other hand, if the thickness is below 0.2 μm, the effects of far-infrared ray generation and luminance increase are trivial.

Figure 4A:
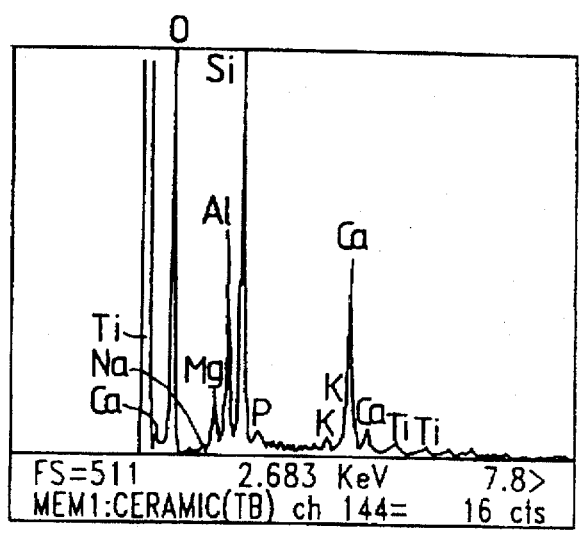
FIGS. 4A and 4B illustrate a spectral analysis (4A) of far-infrared emitting material components used in example 1, and spectral emittance (4B) thereof versus wavelength.
Figure 4B:
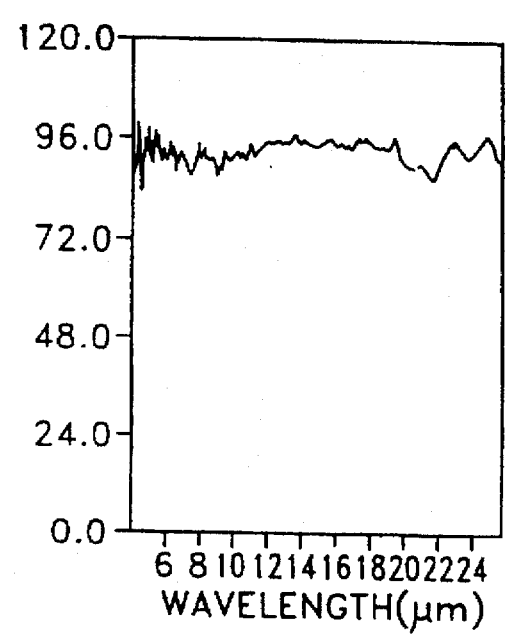

FIGS. 4 are a spectral analysis (4A) of far-infrared emitting material components used in the first example, and a graph (4B) obtained by measuring spectral emittance thereof versus wavelength. In FIG. 4A, the peak of each far-infrared emitting material used can be seen. The spectral emission measuring graph shown in FIG. 4B is obtained by employing a black body (at 40° C.) as a reference, measuring with an FT-IR detector of Bruker Co., and detecting by DTGS. From FIG. 4B, it can be noted that the emission of far-infrared light is intense at wavelengths shorter than 25 μm.

Figure 5:
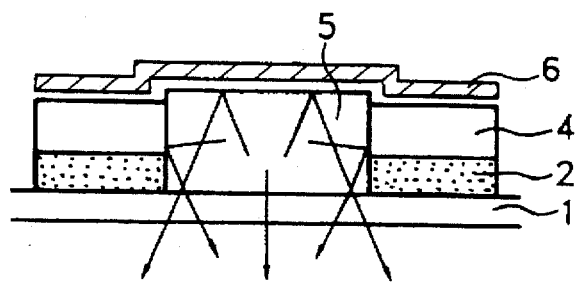
FIG. 5 is a sectional view showing a portion of the screen manufactured by Example 1 of the present invention.

FIG. 5 is a sectional view which illustrates a portion of the screen manufactured by the above example of the present invention. As shown in the drawing, graphite layer 2 and phosphor layer 5 are formed on the inner surface of a panel 1, and far-infrared emitting material layer 4, whose color is off-white, is formed on the graphite layer. Also, an aluminum layer 6 is formed above phosphor layer 5 and far-infrared emitting material layer 4, spaced apart from them by a predetermined distance. Here, since far-infrared emitting material layer 4 is white or off-white, the far-infrared emitting material layer again reflects the light which has been reflected toward the graphite among emitted from the phosphor layer and thus absorbed thereinto, so that luminance is enhanced.

EXAMPLE 2

The same method as example 1 is employed except that a material consisting of $SiO_2$, $Al_2O_3$ and MgO is used as the far-infrared emitting material to manufacture a screen by forming a far-infrared emitting material layer inside a panel and over a black matrix layer of a cathode ray tube.

FIGS. 6 are a spectral analysis table (6A) of far-infrared emitting material components used, and a graph (6B) obtained by measuring spectral emittance thereof versus wavelength. Here, each peak of each far-infrared emitting component can be seen, and it can be noted that the emission of far-infrared light is intense at wavelengths shorter than 25 μm.

As described above, when the cathode ray tube is manufactured while installing the far-infrared emitting material layer over the black matrix layer, the cathode ray tube emits far-infrared rays to give a user an activation effect provided by the far-infrared rays.

The inventor of this invention has confirmed that the enhanced luminance effect can also be obtained by forming the far-infrared emitting material layer over the black matrix layer in accordance with the principle shown in FIG. 5. The luminance of a conventional screen (without a far-infrared emitting layer), and that of screens according to examples 1 and 2 (with the far-infrared emitting layer) are illustrated in <Table 1>. Here, additional data is included for the screens of Examples 1 and 2.

TABLE 1

|  | conventional CRT | Example 1 | Example 2 |
|---|---|---|---|
| emitting layer material | N/A | $SiO_2$, $Al_2O_3$, MgO, $Na_2O$, $P_2O_5$, $K_2O$, CaO, $TiO_2$ | $SiO_2$, $Al_2O_3$, MgO |
| color of emitting layer | N/A | white | light gray |
| thickness of emitting layer (μm) | N/A | 20 | 20 |
| luminance (%) | 100 | 110 | 105 |

Figure 7:
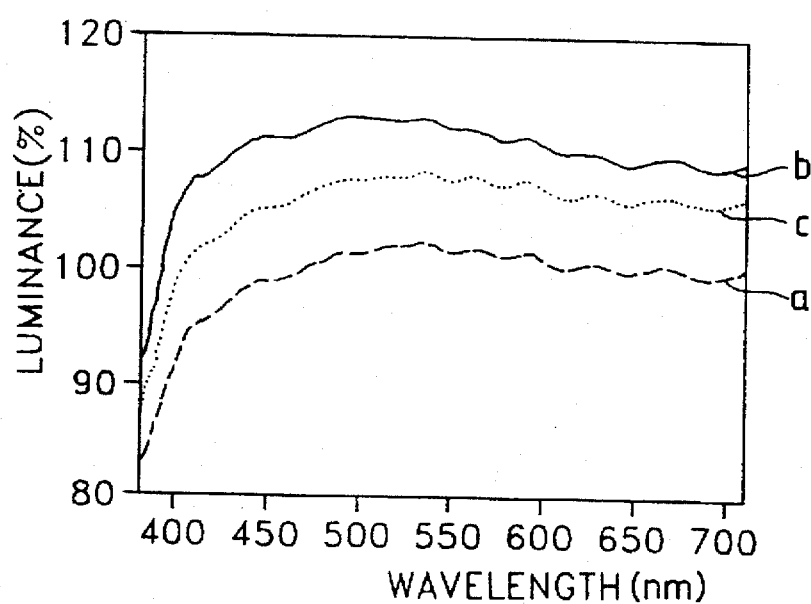
FIG. 7 is a graphical representation illustrating luminance of the conventional screen (a) and the screens according to second Examples 1 and 2 (b and c), respectively.

FIG. 7 is a graphical representation illustrating luminance of the conventional screen (a) and the screens according to examples 1 and 2 (b and c), respectively. Here, the luminance of the screen according to the present invention is enhanced by approximately 5–10% as compared with that of the conventional screen.

As described above, by forming the far-infrared emitting layer over the black matrix, far-infrared rays are emitted from the cathode ray tube and, at the same time, luminance can be enhanced.

Different from the above examples, a cathode ray tube is provided as another example of the present invention, wherein the far-infrared emitting material is contained within the black matrix layer.

The far-infrared emitting material is composed of at least one of $SiO_2$, $Al_2O_3$, $MgO$, $Na_2O$, $P_2O_5$, $K_2O$, $ZrO_2$, $CaO$ and $TiO_2$ and preferably having not more than a 5 μm average particle diameter. Also, the addition or additive amount of graphite can be determined in accordance with the overall color, and the addition of conductivity and the light-absorbing characteristic.

In order to introduce the far-infrared emitting material in the black matrix layer, the far-infrared emitting material is mixed with graphite solution generally used for forming a black matrix, by being subjected to a ball-mill, if necessary, to become consistent. The additive amount of the far-infrared emitting material is 1–100 wt %, preferably 10–100 wt %, when the total amount of the mixture is used as a reference. It is observed that, if the mixed amount of the far-infrared emitting material is increased, the far-infrared emission is increased. Also, the far-infrared emitting effect can be obtained when the content of the far-infrared emitting material is less than 10%, though it is slight.

The prepared mixture having the far-infrared emitting characteristic is applied on the inner surface of the screen as dots or stripes according to the same steps as the conventional black matrix manufacturing steps. That is, the panel is cleansed using distilled water, hydrofluoric acid, etc. Then, a photoresist is coated and dried, thereby forming a photoresist pattern via an exposure and development process. Thereafter, a black matrix pattern is formed by coating and etching a black matrix mixture containing far-infrared emitting material. Finally, the screen is completed by carrying out common phosphor slurry coating, filming composition coating, aluminum deposition, and baking processes.

Upon operating the cathode ray tube, since 20% of the electron beam energy emitted from the electron gun is converted into light, and 80% becomes heat, the far-infrared rays are emitted externally, while increasing the temperature and the emission of far-infrared rays within the cathode ray tube. As expressed by the Stefan-Boltzmann formula (defined as: $W=5.67\times10^{-12}T^4$, where W is the total emitted energy $W/cm^2$, and T is the absolute temperature K), the emitted energy amount is proportional to the absolute temperature, raised to the fourth power thus the higher the applied temperature is, the higher the obtained emitting efficiency is.

Hereinbelow, a preferred example of the cathode ray tube wherein the far-infrared emitting material is introduced into the black matrix, will be described in detail.

EXAMPLE 3

An applied solution composed of 2.5 wt % far-infrared emitting material containing $SiO_2$, $Al_2O_3$, $MgO$, $Na_2O$, $P_2O_3$, $K_2O$, and $TiO_2$, having an average diameter of 3 μm, 2.5 wt % graphite for black matrix having an average diameter of 1 μm, 0.2 wt % sulphonic surface active agent, 0.2 wt % kasil, 2 wt % alumina-based dispersant, and a remainder of distilled water, is subjected to a ball-mill for 24 hours for consistent dispersion, and is formed as a black matrix pattern on the inner surface of the panel. Then, a screen is manufactured in accordance with the conventional method.

Figure 8:
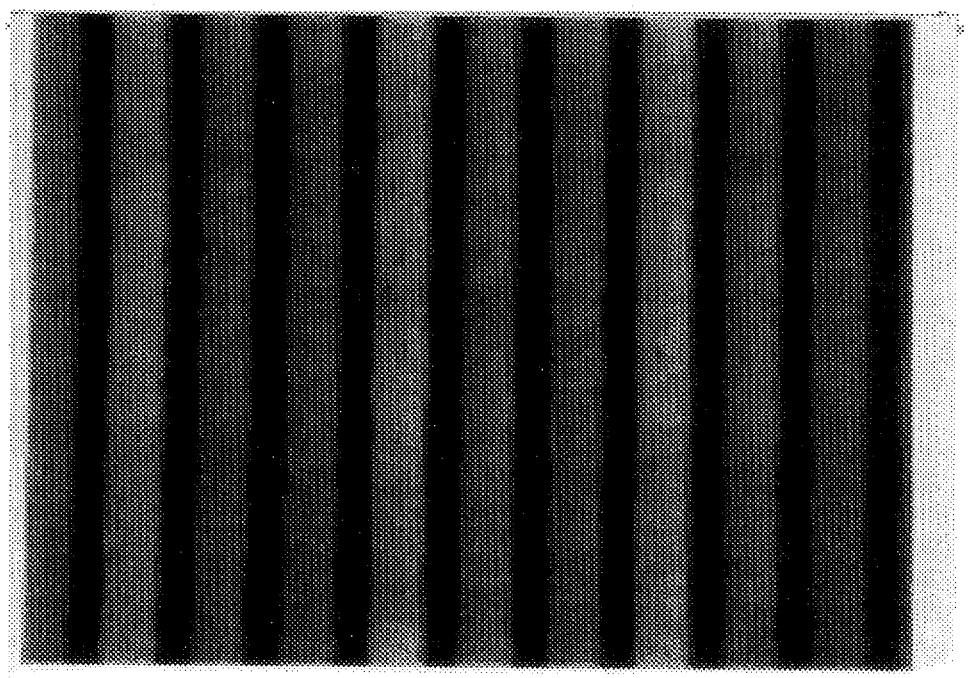
FIG. 8 is a photograph of a screen manufactured by Example 3 of the present invention.

FIG. 8 is a photograph taking the external view of the screen manufactured as above, wherein black lines are a black matrix pattern including the far-infrared emitting material.

To demonstrate the far-infrared emitting effect of the cathode ray tube having the far-infrared emitting material, the following experiment is performed.

Four roses being in bloom to the same degree are put into similar flasks (A, B, C and D), respectively. Then, flask A is placed at a distance of 10 cm from a conventional television operating without the far-infrared emitting material, and flasks B, C and D are also placed at distance of 10 cm from a television operating with the far-infrared emitting material according to Example 3 of the present invention. The above is left in place for 100 hours. Throughout, other parameters are controlled, such as the light intensity emitted from the two kinds of televisions is kept constant, and external light is blocked.

Figure 9:
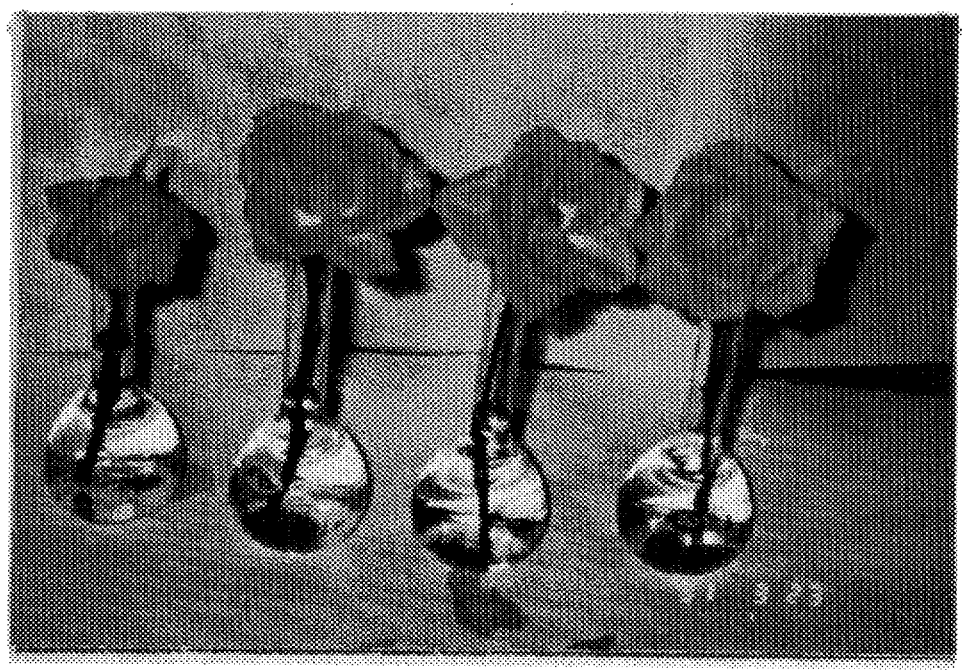
FIG. 9 is a photograph of roses used for demonstrating the far-infrared emitting characteristic of a far-infrared emitting cathode ray tube manufactured by Example 3 of the present invention.

FIG. 9 is a photograph taken after 100 hours showing the relative states of the roses. As shown in the photograph, the rose of flask A is already withered and dried while its petals are brittle, but those of flasks B, C and D are fresh and moist due to sufficient supply of water. It can be considered that this is because the far-infrared rays emitted from the television according to the present invention activate the water in the flasks B, C and D and the inherent water of the roses, so that the withering of the roses is inhibited.

EXAMPLE 4

An applied solution composed of 5 wt % far-infrared emitting material containing $SiO_2$, $Al_2O_3$, $MgO$, $CaO$ and $TiO_2$, having an average diameter of 1 μm, 0.1 wt % non-ionic surfactant, 0.1 wt % graphite for black matrix having an average diameter of 1 μm, 0.1 wt % kasil, 1 wt % $Al(OH)_3$ dispersant, ammonium hydroxide ($NH_4OH$) having an amount capable of producing a pH of 10–11, and a remainder of distilled water, is prepared. This solution is applied on the inner surface of the panel, thereby forming a black matrix pattern. Then, a screen is manufactured in accordance with the conventional method.

Figure 10A:
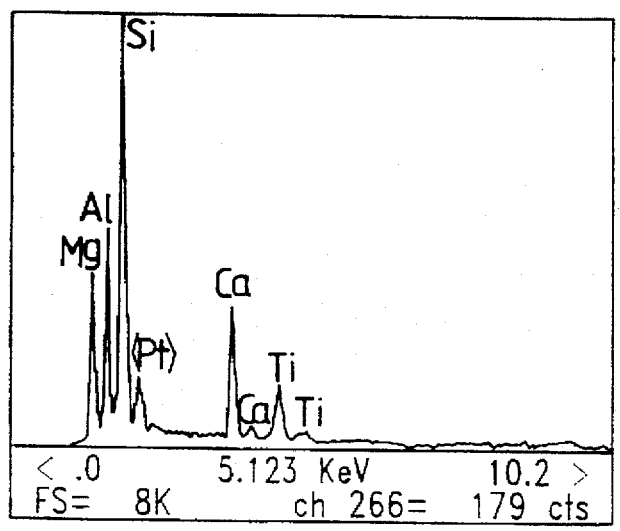
FIGS. 10A and 10B illustrate a spectral analysis (10A) of far-infrared emitting material components used in Example 4, and spectral emittance (10B) thereof versus wavelength.
Figure 10B:
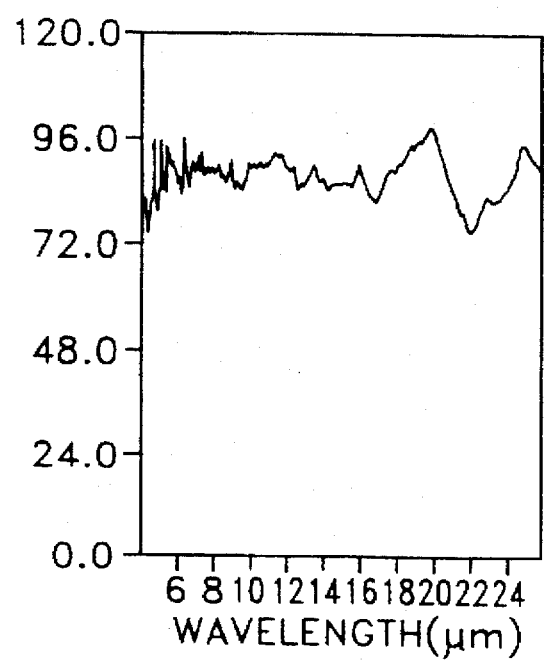

FIGS. 10A and 10B are an analysis table (10A) of far-infrared emitting material component used in the foregoing example, and a graph (10B) obtained by measuring spectral emittance over a given band of wavelengths. In the drawing, the presence of each component and its high emission intensity in the far-infrared region can be confirmed.

Figure 11:
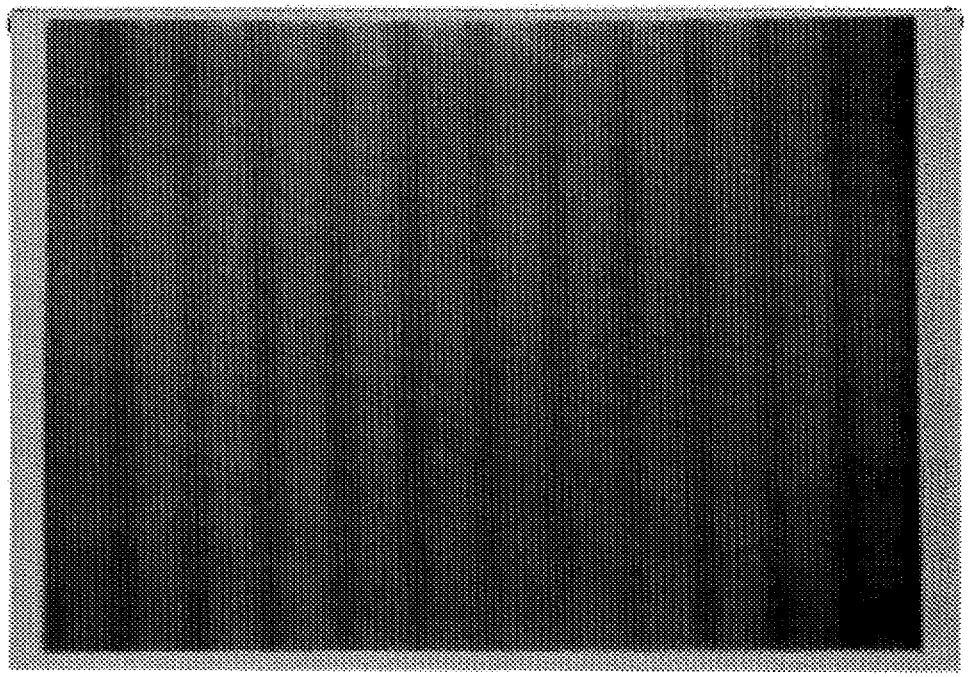
FIG. 11 is a photograph of a screen manufactured by Example 4 of the present invention.

FIG. 11, is a photograph showing the external view of a screen manufactured by the fourth example of the present invention. Here, since there is no graphite in the black matrix layer, this layer appears as white.

The black matrix layer of screen manufactured according to the Example 4 is composed of the far-infrared material only, and cannot function on its own. Therefore, a drawback of degrading color purity of the image exists, but there is a benefit. A high far-infrared emitting effect can be obtained, provided that the black matrix layer according to this example is adapted to a cathode ray tube wherein the above drawback is negligible.

As another example for embodying the present invention, the present invention provides a cathode ray tube which comprises a phosphor layer composed of phosphors as dots or stripes for emitting white or colored light by collision of electron beams, and formed on the inner surface of a panel, wherein a far-infrared emitting material is included in the phosphor layer.

A far-infrared emitting material included in the phosphor layer is composed of $SiO_2$, $Al_2O_3$, MgO, $Co_3O_4$, $TiO_2$, CaO, $K_2O$, and $Na_2O$, as well as transition oxide metals other than these. Preferably, the average particle diameter of these is 0.5–4 μm, and the maximum particle diameter is 8 μm.

Also, in order to sustain the luminous efficiency of the phosphor, the desirable color of the far-infrared emitting material is white or off-white, and a highly purified metal oxide (not mixed with Fe, Co and Ni which decrease the luminous characteristic of the phosphor) is used as the far-infrared material.

To introduce the above-described far-infrared emitting material into the phosphor layer, the material is mixed with phosphor slurry, and this mixture is applied to the conventional manufacturing process of the phosphor layer. At this time, the additive amount of the far-infrared emitting material is not more than 50 wt %, preferably 1–40 wt % of the amount of the phosphor. If the additive amount of the far-infrared emitting material is increased, luminance is lowered even though there is no difference in the luminous spectrum and luminous color coordinates. Accordingly, an additive amount of more than 50 wt % is not preferable.

Here, in the case of the screen for a color cathode ray tube, which has a phosphor layer obtained by forming color phosphor layers on the inside of the panel via several processes of separately prepared red, green and blue luminous phosphor slurry such as coating, drying, exposing and developing, the phosphor layer is manufactured in accordance with a conventional process by mixing the far-infrared emitting material with each color slurry. Here, since the luminous characteristic of the ZnS-based phosphor such as the green luminous phosphor like ZnS:Cu,Au,Al, ZnS:Cu, Al, (Zn,Cd)S:Cu,Al, and blue luminous phosphor like ZnS:Ag is deteriorated by impurities such as Fe, Co and Ni, the purity of the materials (especially of the far-infrared emitting material) must be carefully supervised, so as not to contain such impurities.

The color cathode ray tube with the phosphor layer including the far-infrared emitting material will be given as an example. Here, the case that far-infrared emitting material is included in all color phosphor layers will be described in detail.

EXAMPLE 5

To begin with, 85 g of ZnS:Cu,Au,Al as a green phosphor, a 15 g far-infrared emitting material mixture obtained by mixing $SiO_2$, $Al_2O_3$, MgO, CaO and $TiO_2$ in the same ratio, 200 g of distilled water, 70 g of polyvinyl alcohol, 4.1 g of sodium bichromate, and 50 ml of surface active agent are mixed to prepare the green phosphor slurry. At this time, the average particle diameter of the phosphor is 7 μm, and that of the far-infrared emitting material is 1.5 μm.

In the analysis table of the far-infrared emitting material illustrated in FIG. 10A, each peak of the components is depicted. Also, the graph obtained by measuring the spectral emittance of the far-infrared emitting material shown in FIG. 10B illustrates the fact that the emission efficiency is high in the range below 25 μm.

By using the green phosphor slurry, a green phosphor pattern is formed according to the conventional process.

Figure 12:
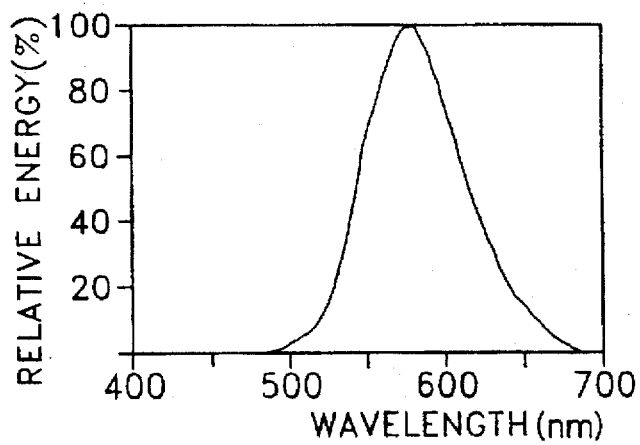
FIGS. 12, 13 and 14 are graphs illustrating the luminous spectrum of green, blue and red phosphor screens manufactured by Example 5 of the present invention, respectively.

The luminous spectrum of the green phosphor layer is represented in FIG. 12, wherein the inherent luminous spectrum of the green phosphor has no difference from that of the conventional phosphor.

Next, 70 g of ZnS:Ag as the blue luminous phosphor having cobalt blue ($CoO \cdot Al_2O_3$) attached thereto, a 10 g far-infrared emitting material mixture composed of $SiO_2$, $Al_2O_3$ and MgO which are mixed in the same ratio, 150 g of distilled water, 80 g of polyvinyl alcohol, 3.8 g of sodium bichromate, and 8 ml of surface active agent are all mixed to produce the blue phosphor slurry. At this time, the average particle diameter of the phosphor is 5 μm and that of the far-infrared emitting material is 1 μm.

Figure 6A:
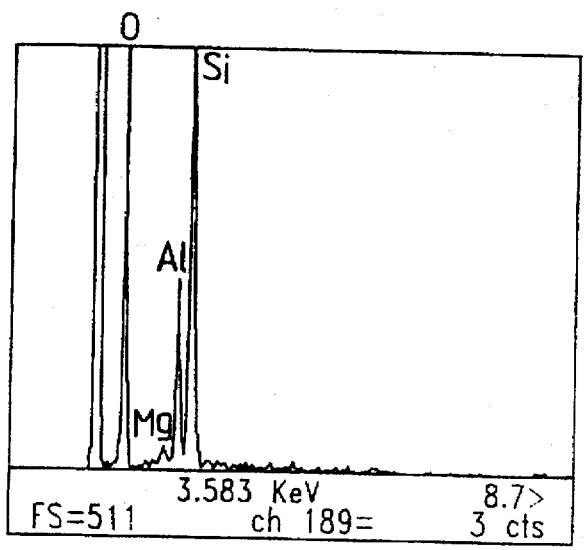
FIGS. 6A and 6B illustrate a spectral analysis (6A) of far-infrared emitting material components used in Example 2, and spectral emittance (6B) thereof versus wavelength.
Figure 6B:
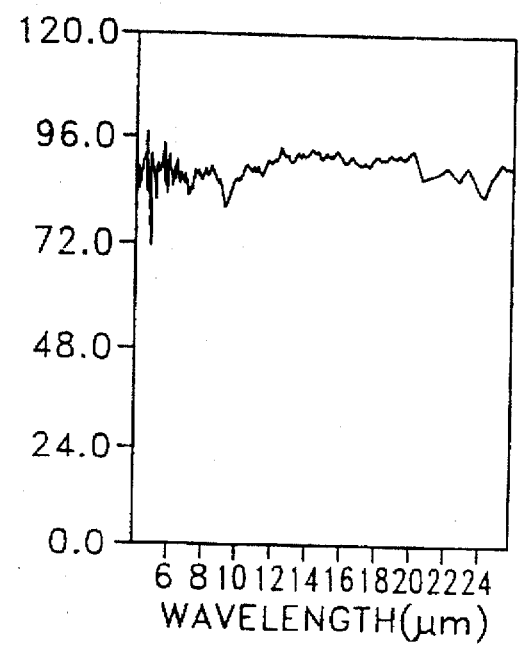

In the analysis table of the far-infrared emitting material illustrated in FIG. 6A, each peak of the components is depicted. Also, the graph obtained by measuring the spectral emittance of the far-infrared emitting material shown in FIG. 6B illustrates the fact that the emission efficiency is high in the range below 25 μm.

By using the blue phosphor slurry, a blue phosphor pattern is formed according to the conventional process.

Figure 13:
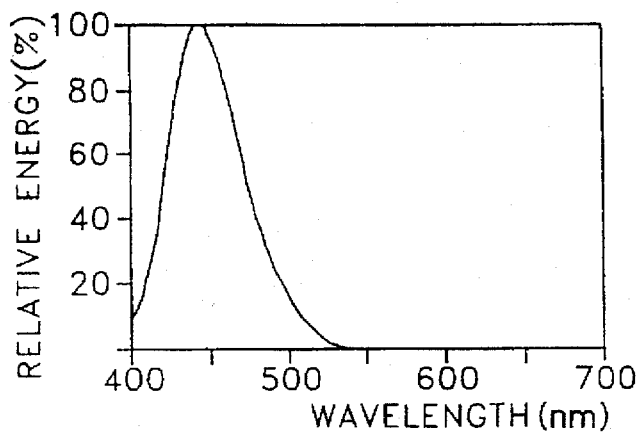

The luminous spectrum of the blue phosphor layer having the far-infrared emitting material is represented in FIG. 13, wherein the inherent luminous spectrum of the blue phosphor has no difference from that of the conventional phosphor.

Lastly, 90 g of $Y_2O_2S$:Eu having the red luminous phosphor having $Fe_2O_3$ attached thereto, a 10 g far-infrared emitting material mixture composed of $SiO_2$, $Al_2O_3$, MgO, $Na_2O$, $K_2O$ and $TiO_2$ mixed in the same ratio, 100 g of distilled water, 50 g of polyvinyl alcohol, 3.7 g of sodium bichromate, and 30 ml of surface active agent are all mixed to produce the red phosphor slurry. At this time, the average particle diameter of the phosphor is 6 μm and that of the far-infrared emitting material is 2 μm.

In the analysis table of the far-infrared emitting material illustrated in FIG. 4A, each peak of the components is depicted. Also, the graph obtained by measuring the spectral emittance of the far-infrared emitting material shown in FIG. 4B illustrates the fact that the emission efficiency is high in the range below 25 μm.

By applying the red phosphor slurry on the inner surface of the panel, a red phosphor pattern is formed according to the conventional processes such as drying, exposing and developing.

Figure 14:
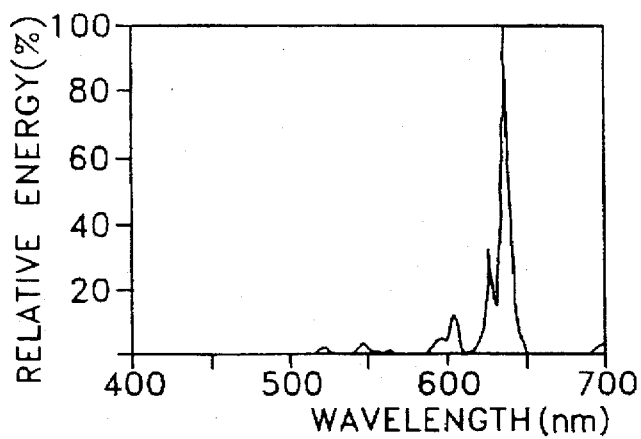

The luminous spectrum of the red phosphor layer having the far-infrared emitting material is represented in FIG. 14, wherein the inherent luminous spectrum of the red phosphor has no difference from that of the conventional phosphor.

The chromaticity on color coordinates and luminance of each phosphor layer are measured to examine the phosphor characteristic of each color phosphor pattern mixed with the far-infrared emitting material, which is manufactured according to the above-described method. This data is shown in <Table 2>, along with the chromaticity of the conventional phosphor layer without the far-infrared emitting material. The relative luminance is the value when the luminance of the conventional phosphor is assumed as 100%.

TABLE 2

| | conventional phosphor | | mixed phosphor | | rel. luminance (%) | luminance dif. (%) |
| --- | --- | --- | --- | --- | --- | --- |
| | X coordinate | Y coordinate | X coordinate | Y coordinate | | |
| red | 0.652 | 0.341 | 0.650 | 0.342 | 95.7 | −4.3 |
| green | 0.313 | 0.610 | 0.314 | 0.607 | 93.0 | −7 |
| blue | 0.152 | 0.058 | 0.152 | 0.055 | 97.3 | −2.7 |

As shown in <Table 2>, and in FIGS. 12, 13 and 14, there is no significant difference in the luminous spectrum and color coordinates when mixing the far-infrared emitting material, though the luminance is slightly lowered. This is because the far-infrared emitting material without the luminous characteristic is mixed in the phosphor layer, which results in degrading the luminous efficiency accordingly. Therefore, the amount of the far-infrared emitting material included in the phosphor slurry must not exceed 50% of the maximum amount of the phosphor, and a favorable body color thereof is also white or off-white for maintaining the luminance efficiency of the phosphor.

Moreover, since the average particle diameter of the phosphor is 5–8 μm and its maximum particle diameter is 10–14 μm, the average and maximum particle diameters of the far-infrared emitting material is preferably below those of the phosphor. When the diameter is minimized as much as possible, such a non-luminous part of the screen which is not displayed after the subsequent formation of the phosphor layer is reduced and the mixing with the pigment and/or phosphor is even better.

As described above, the far-infrared emitting material is included into the phosphor slurry while manufacturing the phosphor layer of the cathode ray tube, so that this cathode ray tube can offer beneficial far-infrared ray to the user. The luminance is slightly degraded, but it is not significant.

To demonstrate the far-infrared emitting effect of the screen completed as above, the following experiment is carried out.

Four roses and four carnations being in bloom to the same degree are put into respective flasks. These are placed 20 cm from a television having the conventional screen operating without the far-infrared emitting material, and a television having the screen manufactured according to the fifth example. The above is left in place for 100 hours.

Additionally, five onions being in the same state of maturity are put into beakers of water such that their roots are 1 cm below the water's surface. The beakers are positioned 10 cm from the flasks for 100 hours in front of the turned on televisions, as are the flowers.

Figure 15A:
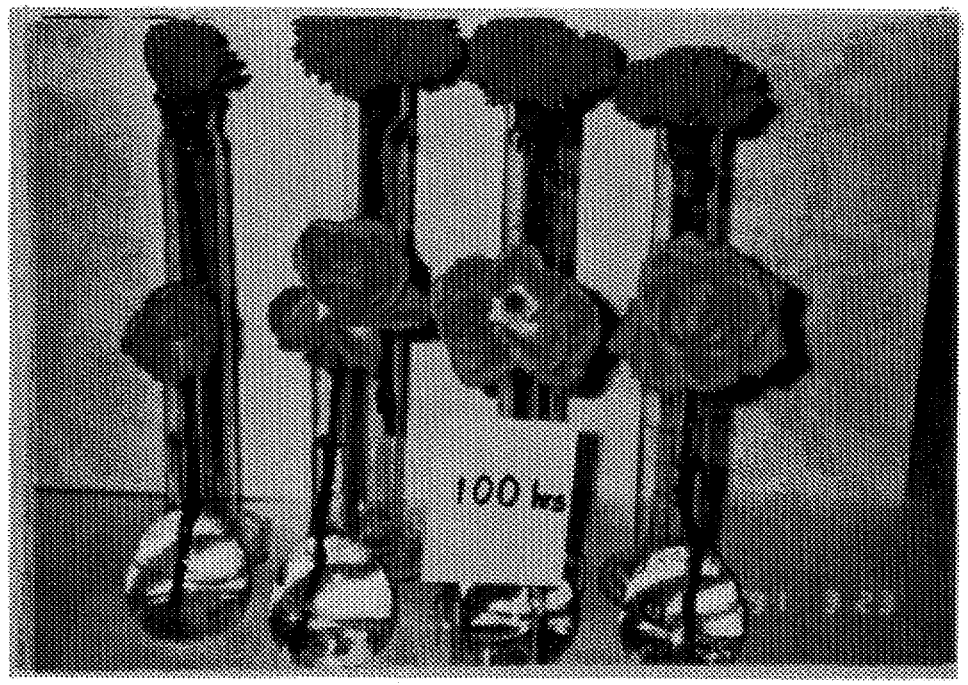
FIGS. 15A and 15B are photographs of roses, carnations and onions used for demonstrating the far-infrared emitting characteristic of a far-infrared emitting cathode ray tube manufactured by Example 5 of the present invention.
Figure 15B:
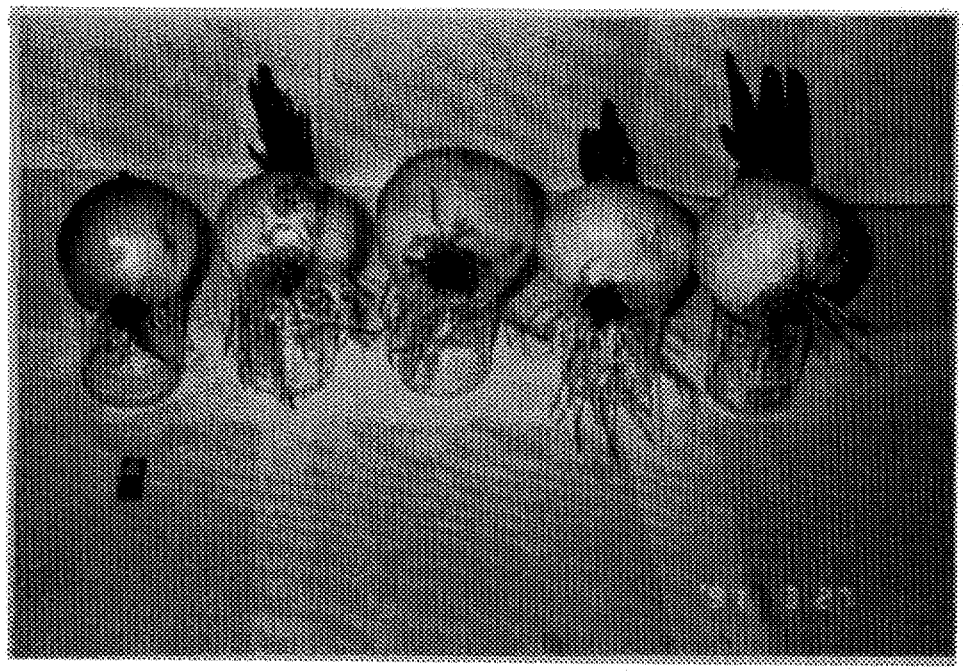

FIGS. 15A and 15B are photographs of the roses, carnations and onions. In FIG. 15A, the leftmost rose and carnation were exposed to the television adopting the conventional screen, and the remaining three roses and carnations were exposed to the television adopting the screen which emits the far-infrared rays manufactured according to the above example. In FIG. 15B, the leftmost onion was exposed to the television having the conventional screen, and the remaining four onions were exposed to the television adopting the screen which emits the far-infrared rays manufactured according to the example. Here, each of the plants that were exposed to the far-infrared emitting cathode ray tube and thus under the influence of the far-infrared rays grew quickly, withered slowly, and maintained freshness, while the flowers exposed to the conventional cathode ray tube withered and dried before blooming, and the onion grew slowly and did not bud.

As a fourth embodiment of the present invention, a far-infrared emitting cathode ray tube comprises a color selecting electrode, i.e., shadow mask, which emits far-infrared rays by forming a far-infrared emitting layer on the outer surface of the shadow mask toward the phosphor layer.

The shadow mask is constructed such that apertures are formed in a metal plate, corresponding to the phosphor to allow the electron beams emitted from the electron gun to accurately collide with the phosphor. Only a portion of the electron beams emitted from the electron gun land on the phosphor layer having passed through the apertures, and the remaining 70–80% collide with the shadow mask. By this collision, electrical energy is instantaneously converted into heat energy, which augments the surface temperature of the shadow mask up to roughly 80° C.

In this embodiment, the far-infrared emitting material is included in the shadow mask requiring several treatments due to the rise of temperature, so that the far-infrared rays can be emitted from the cathode ray tube which had emitted harmful electromagnetic waves.

The far-infrared emitting material is first mixed with solvent to prepare a coating solution. Then, this solution is coated on the surface of the shadow mask, using a spray coating, or using a powder flame or powdered plasma spray which is used for preventing doming of the shadow mask. When using the powder flame or plasma spray, a very securely fixed, far-infrared emitting layer can be manufactured.

The far-infrared emitting material is composed of at least one of aluminium oxide ($Al_2O_3$), silicon dioxide ($SiO_2$), magnesium oxide (MgO), zirconium oxide ($ZrO_2$), carbons, ferric oxide ($Fe_2O_3$), manganese dioxide ($MnO_2$), manganese monoxide (MnO), cupric oxide (CuO), tricobalt tetraoxide ($Co_3O_4$), nickel monoxide (NiO), chromic oxide ($Cr_2O_3$), titanium oxide ($TiO_2$), boron oxide ($B_2O_3$), sodium oxide ($Na_2O$), potassium oxide ($K_2O$), molybdenum sesquioxide ($Mo_2O_3$), calcium oxide (CaO), lithium oxide ($Li_2O$), zinc oxide (ZnO), bismuth oxide ($Bi_2O_3$), barium oxide (BaO), and a mixture of these, wherein a low heat-expansion material is preferable. The particle diameter of the far-infrared emitting material is in the range from 0.05 μm to 2 μm. If the diameter is smaller than 0.05 μm, the far-infrared emitting efficiency is too low, but if greater than 2 μm, the apertures of the shadow mask are clogged. Thus, it is preferable that the above range is maintained, and the average diameter is set to about 0.4 μm.

Also, the thickness of the far-infrared emitting layer to be formed is within 0.1–10 μm, preferably 3–5 μm. The reason for setting the range is that the emittance effect is insufficient when thinner than 0.1 μm, and the apertures are clogged when thicker than 10 μm.

As described above, if the cathode ray tube is manufactured by adopting the shadow mask covered with the far-infrared emitting material on the outer surface thereof, the temperature of the shadow mask increases up to approximately 80° C. due to the collision of the electron beams during cathode ray tube operation, which facilitates the emittance of the far-infrared rays.

Hereinbelow, the preferred embodiment will be described in detail with reference to examples.

EXAMPLE 6

30 wt % of $SiO_2$, 15 wt % of $Al_2O_3$, 30 wt % of $Li_2O$, 10 wt % of ZnO and 15 wt % of $ZrO_2$ are mixed, thereby forming low heat-expansion far-infrared ceramic. Then, a far-infrared emitting mixture for coating the shadow mask is prepared by mixing 20 wt % of the far-infrared ceramic, 20 wt % of frit (lead-borate glass) consisting of 80 wt % of PbO, 10 wt % of $B_2O_3$ and 10 wt % of $SiO_2$, 59 wt % of distilled water, and 1 wt % of a dispersant. This mixture is sprayed on the outer surface of the shadow mask toward the phosphor layer to a thickness of 5 μm and dried, thereby forming the shadow mask coated with the far-infrared emitting material.

EXAMPLE 7

Figure 16:
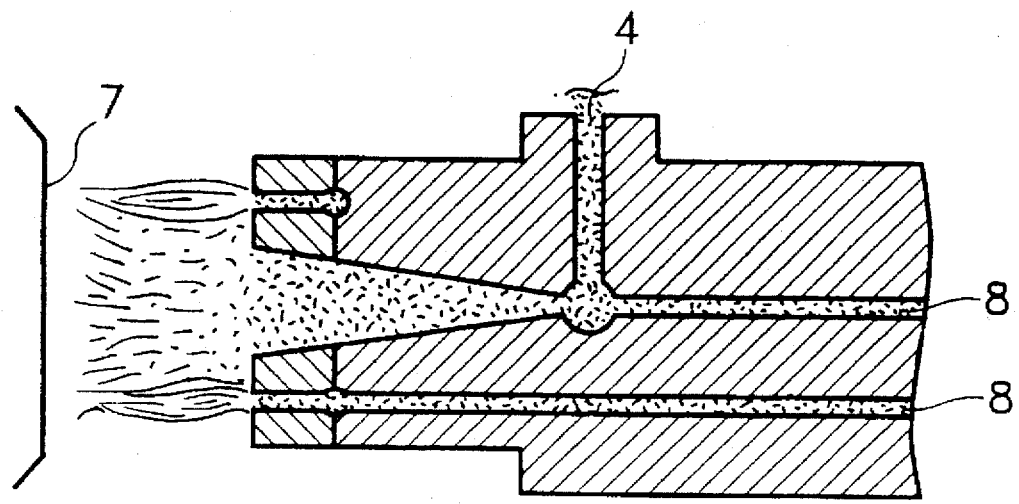
FIG. 16 is a view for illustrating a method for manufacturing a shadow mask according to Example 7 of the present invention.

35 wt % of $SiO_2$, 4 wt % of $Al_2O_3$, 55 wt % of $ZrO_2$, 4 wt % of $Fe_2O_3$ and 2 wt % of $Bi_2O_3$ are consistently mixed, thereby forming far-infrared emitting material. The average particle diameter of the far-infrared emitting material is 1 μm, and the maximum particle diameter is 1.5 μm. As shown in FIG. 16, the far-infrared emitting material is coated on the outer surface of the shadow mask to a thickness of 3 μm by the powder flame spray. According to this method, far-infrared emitting material 4 is sprayed by high-pressure air and, simultaneously, oxygen and acetylene gases 8 are sprayed to flame, so that a compact far-infrared emitting layer is formed on shadow mask 7.

EXAMPLE 8

Figure 17:
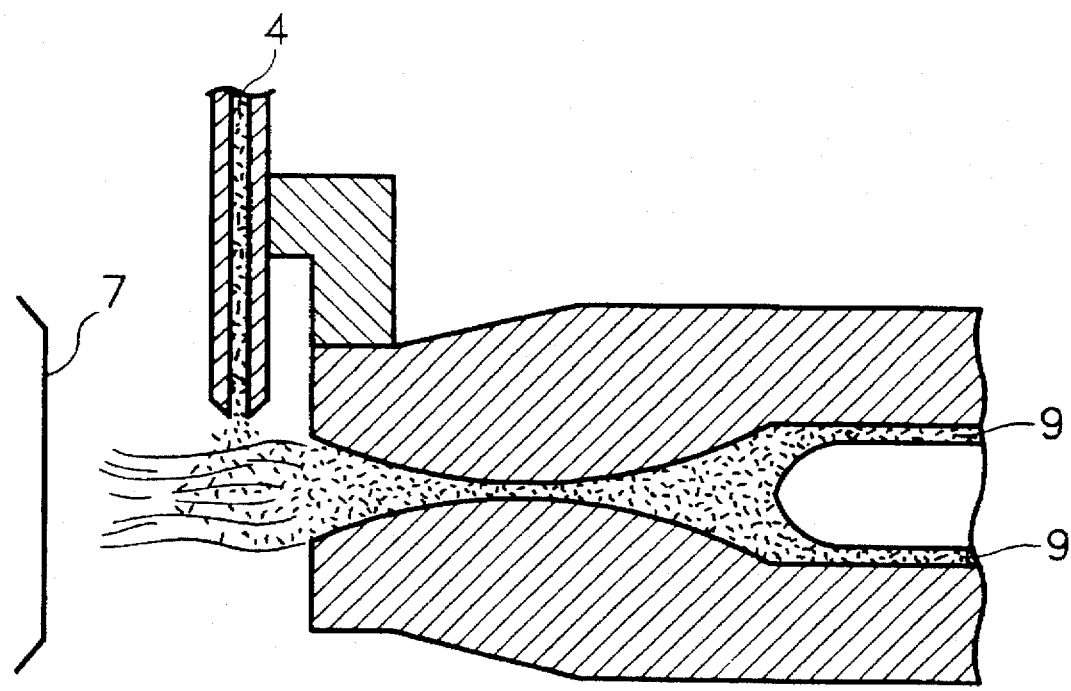
FIG. 17 is a view for illustrating a method for manufacturing a shadow mask according to Example 8 of the present invention.

60 wt % of $SiO_2$, 20 wt % of $Al_2O_3$, 5 wt % of $Fe_2O_3$ and 5 wt % of MgO are consistently mixed, thereby forming far-infrared emitting powder. The far-infrared emitting powder thus obtained is coated on the outer surface of the shadow mask by plasma spray as shown in FIG. 17, thereby forming the far-infrared emitting layer to a thickness of 5 μm. According to the plasma spray, high-pressure argon or nitrogen gases 9 are sprayed to produce a high-voltage arc, which in turn creates plasma and simultaneously supplies far-infrared emitting powder 4. Thus, a compact far-infrared emitting layer is formed on the outer surface of shadow mask 7.

As described above, when the far-infrared emitting material layer is formed on the outer surface of the shadow mask, the temperature is increased to approximately 80° C., so that an excellent far-infrared emitting effect can be obtained as compared with that forming the material in other parts.

As a fifth embodiment of the present invention, a cathode ray tube comprises an envelope formed by a panel, a funnel and neck, wherein the far-infrared emitting material is included in the outer graphite layer covering the outer surface of the funnel, and thus emits the far-infrared rays.

The graphite formed on the outer surface of the funnel functions as a capacitor. In the cathode ray tube, an anode is supplied with 25 KV which is supplied by rectifying the output of the flyback transformer. Since this output is obtained from a square wave input, the ripple is high. Generally, in a rectifier circuit, a capacitor is used in a smoothing element to eliminate the ripple. Here, the outer and inner graphite layers of the cathode ray tube serve as the capacitor.

In an office environment, the rear portion of a computer terminal often faces another person is back, thus electromagnetic waves are likely to harm the person. However, in this embodiment, the far-infrared emitting material is included in the outer graphite layer to emit the far-infrared rays from the rear portion of the cathode ray tube.

On the other hand, as described above in view of the Stefan-Boltzmann formula, the emitted energy amount is in proportional to 4-square of the absolute temperature raised to the fourth power. This denotes that the applied temperature should be high to heighten the emission efficiency of the far-infrared rays and increase the amount of emitted energy. In the case of the terminal mounted with the cathode ray tube, the temperature of the outer graphite is increased to 45°–55° C., after being turned on. Also, the larger the size of the cathode ray tube is, the higher the temperature becomes, and under certain circumstances, up to about 70° C. Therefore, more far-infrared radiation can be emitted from the outer graphite, using the natural heat generated during the operation of the terminal.

A method for manufacturing the cathode ray tube including the far-infrared emitting material in the outer graphite layer will be described in detail.

EXAMPLE 9

15 wt % of graphite for outer graphite layer, 15 wt % of a mixture of $SiO_2$, $Al_2O_3$, MgO, CaO and $TiO_2$, 0.1 wt % of kasil, 5 wt % of the others, and the remainder of distilled water are mixed to form a composition for the outer graphite layer.

The overall composition is tinted gray since the introduced far-infrared emitting material is white. In accordance with the common method, the obtained composition is sprayed to coat the outer surface of the funnel, using a spray gun for coating under high pressure (more than 1.5 kg/cm$^2$).

FIG. 10A illustrates the spectral analysis of the far-infrared emitting material used in the above example, and FIG. 10B illustrates the spectral emittance graph versus wavelength.

Figure 18:
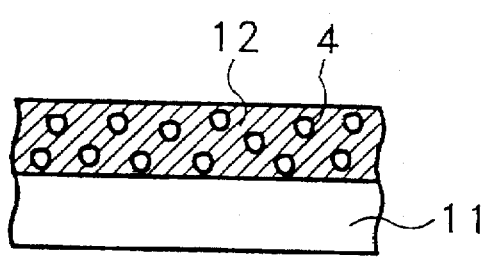
FIG. 18 shows a cross-sectional view of a portion of a funnel of a cathode ray tube manufactured according to Example 9 of the present invention.

FIG. 18 shows a cross-sectional view of a portion of a funnel of the cathode ray tube 10 manufactured according to the example 9 of the present invention, wherein the far-infrared emitting material 4 is consistently mixed with the outer graphite 12 on the funnel 11.

Figure 19:
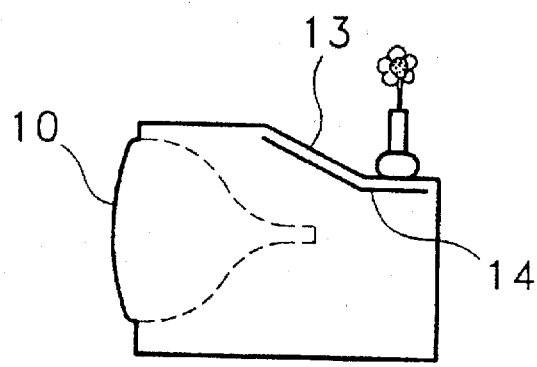
FIG. 19 illustrates the experimentation method used for demonstrating the effect of emitting far-infrared rays in the far-infrared emitting cathode ray tube manufactured by Example 9 of the present invention.

To demonstrate the far-infrared emitting effect of the cathode ray tube having the outer graphite layer which has been manufactured by including the far-infrared emitting material, the following experiment is executed, which will be described with reference to FIG. 19.

Three roses in bloom to the same degree are put into respective flasks. First, the cathode my tube produced according to example 9 of the present invention is installed on a cabinet 13, one rose (A) is placed near a vent 14 of the cabinet, as shown in the drawing. Another rose (B) is placed on a conventional cathode ray tube of the same type as example 9, except that the far-infrared emitting material is omitted. The third rose (C) is placed so as not to be affected by electromagnetic waves from any cathode ray tube.

Among the above three roses, rose B stops blooming after 70 hours, and the tips of its petals begin to turn black after 90 hours. However, roses A and C are still in bloom. After 120 hours, the petals of rose B are completely scorched and its stalk is also dried. At this time, the petals of rose A begins to dry slightly. After 160 hours, the petals and stalk of rose B are dried up and mummify. At this time, rose A is drying, and rose C is beyond full bloom. The results obtained by measuring the temperature at each location after the elapse of 160 hours is shown in <Table 3>.

TABLE 3

| classification | A | B | C |
| --- | --- | --- | --- |
| temperature of water in flask (°C.) | 37 | 37 | 26 |
| surface temperature of vent in cabinet (°C.) | 40 | 40 | N/A |
| surface temperature of outer graphite (°C.) | 43 | 43 | N/A |

After 160 hours, wherein rose A is placed on the rear portion of the cathode ray tube manufactured according to the example 9, rose B is on the conventional cathode ray tube, and rose C is put outside the influence of a cathode ray tube. Rose A under the influence of the far-infrared rays begins drying earlier than rose C in natural surroundings, because the water temperature in the flask is 37° C. due to the heat emitted from the cathode ray tube as shown in the <Table 3>, and because of the harmful electromagnetic effects on rose A. However, when comparing roses A and B, it can be confirmed that far-infrared rays emitted from the outer graphite layer of the cathode ray tube are useful for a living body.

EXAMPLE 10

30 wt % of a mixture of $SiO_2$, $Al_2O_3$ and MgO, 20 wt % of kasil, and 50 wt % of distilled water are mixed to form a composition for outer graphite layer.

After the above composition obtained according to the conventional method is coated over the outer graphite layer of a cathode ray tube by spray or brush, it is dried in an oven at 100° C. for 30 minutes.

FIGS. 6 show the spectral analysis (FIG. 6A) of the far-infrared emitting material, and the graph (FIG. 6B) obtained by measuring spectral emittance of the far-infrared emitting material used in the above example.

Figure 20:
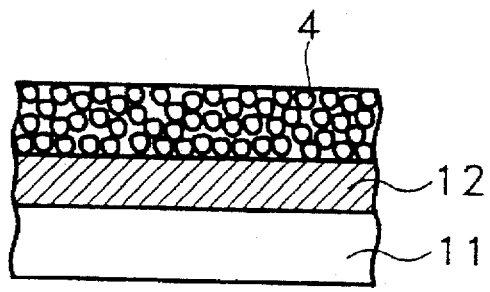
FIG. 20 shows a cross-sectional view of a portion of a funnel of a cathode ray tube manufactured according to a tenth example of the present invention.

FIG. 20 shows a cross-sectional view of a portion of a funnel of cathode ray tube 10 manufactured according to the above example of the present invention, wherein far-infrared emitting material layer 4 is formed over outer graphite layer 12 on funnel 11.

The cathode ray tube manufactured according to example 10 also has a far-infrared emitting effect similar to that of the cathode ray tube manufactured according to example 9.

In the present invention as described above, far-infrared ray material is included in each part of the interior of the cathode ray tube, so that far-infrared rays are emitted. Therefore, the conventional cathode ray tube which has emitted electromagnetic waves harmful to living bodies is modified according to the present invention to emit; far-infrared rays which are useful, thereby providing pleasant working surroundings to the user who operates the cathode ray tube.

Apart from the far-infrared emitting cathode ray tube described with reference to the examples according to the present invention, it will be apparent that many modifications and variations could be effected easily by one skilled in the art without departing from the spirit or scope of the novel concepts of the present invention, including monochrome and color cathode ray tubes.

What is claimed is:

1. A screen for a cathode ray tube that simultaneously emits far-infrared radiation and produces visible images comprising:
   a panel;
   a black matrix layer including a plurality of stripes disposed on said panel;
   a layer comprising particles of an inorganic oxide having an average diameter of up to 5 μm disposed on said black matrix layer and emitting far-infrared radiation having a wavelength in a range from 5 μm to 1,000 μm in response to incident electrons; and
   a phosphor layer disposed on said panel between the stripes of said black matrix layer, said phosphor layer emitting visible light having a wavelength in a range from 0.4 μm to 0.7 μm in response to incident electrons.

2. The screen as claimed in claim 1 wherein said layer comprising an inorganic oxide is 0.5–5.0 μm thick.

3. The screen as claimed in claim 1 wherein said inorganic oxide is selected from the group consisting of aluminum oxide ($Al_2O_3$), silicon dioxide ($SiO_2$), magnesium oxide (MgO), zirconium oxide ($ZrO_2$), ferric oxide ($Fe_2O_3$), manganese dioxide ($MnO_2$), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO), and mixtures thereof.

4. A screen for a cathode ray tube that simultaneously emits far-infrared radiation and produces visible images comprising:
   a panel;
   a black matrix layer including a plurality of stripes disposed on said panel, said black matrix layer including particles of an inorganic oxide having an average diameter of up to 5 μm and emitting far-infrared radiation having a wavelength in a range from 5 μm to 1,000 μm in response to incident electrons; and
   a phosphor layer disposed on said panel between the stripes of said black matrix layer, said phosphor layer containing a phosphor emitting visible light having a wavelength in a range from 0.4 μm to 0.7 μm in response to incident electrons.

5. The screen as claimed in claim 4 wherein said inorganic oxide is selected from the group consisting of aluminum oxide ($Al_2O_3$), silicon dioxide ($SiO_2$), magnesium oxide (MgO), zirconium oxide ($ZrO_2$), ferric oxide ($Fe_2O_3$), manganese dioxide ($MnO_2$), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO), and mixtures thereof.

6. A screen for a cathode ray tube that simultaneously emits far-infrared radiation and produces visible images comprising:
   a panel;
   a black matrix layer including a plurality of stripes disposed on said panel; and
   a phosphor layer disposed on said panel between the stripes of said black matrix layer, said phosphor layer containing a phosphor emitting visible light having a wavelength in a range from 0.4 μ, to 0.7 μm in response to incident electrons and including particles of an inorganic oxide having an average diameter of between 0.5 μm and 4 μm, a maximum diameter of 8 μm, and emitting far-infrared radiation having a wavelength in a range from 5 μm to 1,000 μm in response to incident electrons.

7. The screen as claimed in claim 6 wherein said inorganic oxide is selected from the group consisting of aluminum oxide ($Al_2O_3$), silicon dioxide ($SiO_2$), magnesium oxide (MgO), zirconium oxide ($ZrO_2$), ferric oxide ($Fe_2O_3$), manganese dioxide ($MnO_2$), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO), and mixtures thereof.

8. The screen as claimed in claim 6 wherein said inorganic oxide is a metal oxide free from iron (Fe), cobalt (Co), and nickel (Ni).

9. The screen as claimed in claim 6 wherein said inorganic oxide is white.

10. A shadow mask for a cathode ray tube that simultaneously emits far-infrared radiation and produces visible images, said shadow mask having a front surface facing a phosphor layer of the cathode ray tube and a rear surface facing an electron gun of the cathode ray tube, said shadow mask comprising:
   a metal plate having a plurality of apertures for transmitting electrons from an electron gun opposite a rear surface of said metal plate to a phosphor layer of a cathode ray tube including said shadow mask, the phosphor layer being disposed opposite a front surface of said metal plate; and particles of an inorganic oxide having diameters in a range of 0.5–2 µm in a thickness of about 0.1–10 µm disposed on the front surface of said metal plate, said inorganic oxide emitting far-infrared radiation having a wavelength in a range from 5 µm to 1,000 µm in response to electrons incident on the rear surface of said metal plate.

11. The shadow mask as claimed in claim 10 wherein said inorganic oxide is selected from the group consisting of aluminum oxide ($Al_2O_3$), silicon dioxide ($SiO_2$), magnesium oxide (MgO), zirconium oxide ($ZrO_2$), ferric oxide ($Fe_2O_3$), manganese dioxide ($MnO_2$), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO), and mixtures thereof.

12. A cathode ray tube that simultaneously emits far-infrared radiation and produces visible images comprising:

a panel;

a funnel connected to said panel, said funnel having inner and outer surfaces and including a neck portion; and a layer about 5 µm thick including a mixture of particles of an inorganic oxide emitting far-infrared radiation having a wavelength in a range from 5 µm to 1,000 µm in response to incident thermal energy and graphite disposed on the outer surface of said funnel.

13. A cathode ray tube that simultaneously emits far-infrared radiation and produces visible images comprising:

a panel;

a black matrix layer including a plurality of stripes disposed on said panel;

a layer comprising particles of an inorganic oxide having an average diameter of up to 5 µm disposed on said black matrix layer and emitting far-infrared radiation having a wavelength in a range from 5 µm to 1,000 µm in response to incident electrons; and a phosphor layer disposed on said panel between the stripes of said black matrix layer, said phosphor layer emitting visible light having a wavelength in a range from 0.4 µm to 0.7 µm in response to incident electrons.

14. The cathode ray tube as claimed in claim 13 wherein said inorganic oxide is selected from the group consisting of aluminum oxide ($Al_2O_3$), silicon dioxide ($SiO_2$), magnesium oxide (MgO), zirconium oxide ($ZrO_2$), ferric oxide ($Fe_2O_3$), manganese dioxide ($MnO_2$), cupric oxide (CuO), tricobalt tetraoxide ($Co_3O_4$), nickel monoxide (NiO), chromic oxide ($Cr_2O_3$), lithium oxide ($Li_2O$), zinc oxide (ZnO), bismuth oxide ($Bi_2O_3$), barium oxide (BaO), titanium oxide ($TiO_2$), boron oxide ($B_2O_3$), sodium oxide ($Na_2O$), potassium oxide ($K_2O$), phosphorus pentoxide ($P_2O_5$), molybdenum sesquioxide ($Mo_2O_3$), calcium oxide (CaO), and mixtures thereof.

15. A cathode ray tube that simultaneously emits far-infrared radiation and produces visible images comprising:

a panel;

a black matrix layer having a plurality of stripes disposed on said panel, said black matrix layer including particles of an inorganic oxide having an average diameter of up to 5 µm and emitting far-infrared radiation having a wavelength in a range from 5 µm to 1,000 µm in response to incident electrons; and a phosphor layer disposed on said panel between the stripes of said black matrix layer, said phosphor layer containing a phosphor emitting visible light having a wavelength in a range from 0.4 µm to 0.7 µm in response to incident electrons.

16. A cathode ray tube that simultaneously emits far-infrared radiation and produces visible images comprising:

a panel;

a black matrix layer including a plurality of stripes disposed on said panel; and a phosphor layer disposed on said panel between the stripes of said black matrix layer, said phosphor layer containing a phosphor emitting visible light having a wavelength in a range from 0.4 µm to 0.7 µm in response to incident electrons and including particles of an inorganic oxide having an average diameter of up to 5 µm and emitting far-infrared radiation having a wavelength in a range from 5 µm to 1,000 µm in response to incident electrons.

17. A cathode ray tube including a shadow mask and that simultaneously emits far-infrared radiation and produces visible images, said shadow mask having a front surface facing a phosphor layer of the cathode ray tube and a rear surface facing an electron gun of the cathode ray tube, said shadow mask of said cathode ray tube comprising:

a metal plate having a plurality of apertures for transmitting electrons from an electron gun opposite a rear surface of said metal plate to a phosphor layer of said cathode ray tube including said shadow mask, the phosphor layer being disposed opposite a front surface of said metal plate and emitting visible light having a wavelength in a range from 0.4 µm to 0.7 µm in response to incident electrons; and particles of an inorganic oxide having a diameter of 0.5–2 µm in a thickness of about 0.1–10 µm disposed on the front surface of said metal plate, said inorganic oxide emitting far-infrared radiation having a wavelength in a range from 5 µm to 1,000 µm in response to electrons incident on the rear surface of said metal plate.

* * * * *